United States Patent
Nagaraj

(10) Patent No.: US 10,636,015 B2
(45) Date of Patent: *Apr. 28, 2020

(54) AUTOMATED SCHEDULE SYSTEMS AND METHODS

(71) Applicant: Sharat Nagaraj, Raleigh, NC (US)

(72) Inventor: Sharat Nagaraj, Raleigh, NC (US)

(*) Notice: Subject to any disclaimer, the term of this patent is extended or adjusted under 35 U.S.C. 154(b) by 97 days.

This patent is subject to a terminal disclaimer.

(21) Appl. No.: 15/710,493

(22) Filed: Sep. 20, 2017

(65) Prior Publication Data

US 2018/0012195 A1    Jan. 11, 2018

Related U.S. Application Data

(63) Continuation-in-part of application No. 14/844,901, filed on Sep. 3, 2015, now abandoned, which is a continuation of application No. 13/163,684, filed on Jun. 18, 2011, now Pat. No. 9,129,266.

(60) Provisional application No. 61/356,312, filed on Jun. 18, 2010.

(51) Int. Cl.
| | |
|---|---|
| *G06Q 10/10* | (2012.01) |
| *H04L 29/08* | (2006.01) |
| *G06Q 50/00* | (2012.01) |
| *G06Q 30/02* | (2012.01) |

(52) U.S. Cl.
CPC ......... *G06Q 10/1095* (2013.01); *G06Q 10/10* (2013.01); *G06Q 10/109* (2013.01); *G06Q 30/0207* (2013.01); *G06Q 50/01* (2013.01); *H04L 67/306* (2013.01)

(58) Field of Classification Search
CPC ...... G06Q 10/109; G06Q 50/22; G06Q 50/24; G06Q 40/08; G06F 19/328; H04L 29/08846; H04L 51/04; H04L 51/12; H04L 51/38; H04L 63/0807; H04L 63/104; H04L 67/04; H04L 67/28; H04L 69/329

See application file for complete search history.

(56) References Cited

U.S. PATENT DOCUMENTS

| | | | |
|---|---|---|---|
| 7,058,853 B1 | 6/2006 | Kavanappillil et al. |
| 7,085,818 B2 | 8/2006 | Brown et al. |
| 7,089,193 B2 | 8/2006 | Newbold |
| 7,143,417 B2 | 11/2006 | Myers |
| 7,188,073 B1 | 3/2007 | Tam et al. |
| 7,519,924 B2 | 4/2009 | Bocking et al. |
| 7,624,424 B2 | 11/2009 | Morita et al. |
| 7,689,441 B1 | 3/2010 | Craft |
| 7,702,545 B1 | 4/2010 | Compton et al. |
| 7,747,458 B2 | 6/2010 | Lyle et al. |
| 7,865,386 B2 | 1/2011 | Sarkar |
| 7,937,439 B2 | 5/2011 | Lurie |
| 8,185,426 B1 | 5/2012 | Khoubyari |

(Continued)

FOREIGN PATENT DOCUMENTS

WO    2016049555 A1    3/2016

*Primary Examiner* — Ninos Donabed
(74) *Attorney, Agent, or Firm* — Neo IP

(57) ABSTRACT

Automated matching, notification, and acceptance/rejection of appointment or opening in a calendar/schedule via network-based systems and methods, including application over social networks and website based connection between users and service providers. Notifications include offers of rewards and/or incentives, which are in the form of discounts, promotions, and/or a currency such as a cryptocurrency.

17 Claims, 4 Drawing Sheets

(56) References Cited

U.S. PATENT DOCUMENTS

| | | |
|---|---|---|
| 8,244,566 B1 | 8/2012 | Coley et al. |
| 8,527,589 B2 | 9/2013 | Russo et al. |
| 8,577,696 B2 | 11/2013 | Fram et al. |
| 8,595,046 B1 | 11/2013 | Christian |
| 8,688,466 B2 | 4/2014 | Tavakol et al. |
| 9,704,208 B2 | 7/2017 | Tavakol |
| 2002/0102012 A1 | 8/2002 | Keller et al. |
| 2002/0156672 A1 | 10/2002 | Burko |
| 2002/0178229 A1* | 11/2002 | Sinha ............... G06Q 10/10 709/206 |
| 2002/0191035 A1* | 12/2002 | Selent ............... G06F 3/0481 715/866 |
| 2003/0086536 A1 | 5/2003 | Salzberg et al. |
| 2003/0131143 A1 | 7/2003 | Myers |
| 2003/0154116 A1 | 8/2003 | Lofton |
| 2004/0098740 A1 | 5/2004 | Maritzen et al. |
| 2004/0267585 A1 | 12/2004 | Anderson et al. |
| 2005/0002501 A1 | 1/2005 | Elsey et al. |
| 2005/0002509 A1 | 1/2005 | Elsey et al. |
| 2005/0097440 A1 | 5/2005 | Lusk et al. |
| 2005/0102154 A1 | 5/2005 | Dodd et al. |
| 2005/0132033 A1 | 6/2005 | Russo et al. |
| 2005/0222875 A1 | 10/2005 | Lordeman et al. |
| 2005/0262132 A1 | 11/2005 | Morita et al. |
| 2006/0015376 A1 | 1/2006 | Sattler et al. |
| 2006/0293943 A1 | 12/2006 | Tischhauser et al. |
| 2007/0021998 A1 | 1/2007 | Laithwaite et al. |
| 2007/0143399 A1* | 6/2007 | Qi ............... G06Q 10/06311 709/204 |
| 2007/0143412 A1* | 6/2007 | Qi ............... G06Q 10/10 709/206 |
| 2007/0282656 A1 | 12/2007 | Battcher et al. |
| 2008/0033889 A1 | 2/2008 | Tappan et al. |
| 2008/0040193 A1 | 2/2008 | Dion |
| 2008/0091726 A1 | 4/2008 | Koretz et al. |
| 2008/0160956 A1* | 7/2008 | Jackson ............... H04M 3/02 455/406 |
| 2008/0189159 A1* | 8/2008 | Jain ............... G06Q 10/109 705/7.18 |
| 2008/0195312 A1 | 8/2008 | Aaron et al. |
| 2008/0249830 A1 | 10/2008 | Gilman et al. |
| 2008/0294999 A1* | 11/2008 | Bank ............... G06Q 10/00 715/751 |
| 2009/0076820 A1* | 3/2009 | Paik ............... G10L 13/00 704/260 |
| 2009/0125332 A1 | 5/2009 | Martin |
| 2009/0125358 A1 | 5/2009 | Reynard |
| 2009/0164236 A1* | 6/2009 | Gounares ............... G06Q 10/00 705/2 |
| 2009/0177503 A1 | 7/2009 | Kawano et al. |
| 2009/0193087 A1* | 7/2009 | Lee ............... G06Q 10/109 709/206 |
| 2009/0204938 A1* | 8/2009 | Schindler ............... G06F 8/10 717/105 |
| 2009/0219166 A1* | 9/2009 | MacFarlane ............... H04M 1/72566 340/691.4 |
| 2009/0281990 A1* | 11/2009 | Greenspan ............... G06F 16/9535 |
| 2010/0022856 A1 | 1/2010 | Cinbis et al. |
| 2010/0070296 A1 | 3/2010 | Massoumi et al. |
| 2010/0070297 A1 | 3/2010 | Tavakol et al. |
| 2010/0070303 A1 | 3/2010 | Massoumi et al. |
| 2010/0106626 A1 | 4/2010 | Ashrafzadeh et al. |
| 2010/0153162 A1 | 6/2010 | Tam et al. |
| 2010/0191552 A1 | 7/2010 | Behrens et al. |
| 2011/0191122 A1 | 8/2011 | Tavakol et al. |
| 2011/0270643 A1 | 11/2011 | Reichman |
| 2012/0278165 A1 | 11/2012 | Mercuri et al. |
| 2014/0095239 A1 | 4/2014 | Mansfield et al. |
| 2014/0249878 A1* | 9/2014 | Kaufman ............... G06Q 10/1095 705/7.19 |
| 2014/0278489 A1 | 9/2014 | Navani et al. |
| 2015/0112696 A1 | 4/2015 | Tavakol |
| 2015/0235183 A1 | 8/2015 | Sampson et al. |
| 2016/0225114 A1* | 8/2016 | Fafara ............... G06F 19/3456 |
| 2016/0378549 A1* | 12/2016 | Irish ............... H04L 67/1002 718/107 |

* cited by examiner

AUTOMATED SCHEDULE SYSTEMS AND METHODS

CROSS-REFERENCE TO RELATED APPLICATIONS

The present invention is related to one or more prior-filed patent applications and claims priority therefrom; it is a continuation-in-part of U.S. application Ser. No. 14/844,901, filed Sep. 3, 2015, which is a continuation of U.S. application Ser. No. 13/163,684, filed Jun. 18, 2011, now U.S. Pat. No. 9,129,266, which claims the benefit from U.S. Provisional Patent Application No. 61/356,312 filed Jun. 18, 2010, each of which is incorporated herein by reference in its entirety.

BACKGROUND OF THE INVENTION

1. Field of the Invention

The present invention relates to scheduling systems and methods and, more specifically, to automated schedule and calendar systems and methods with network-based notification of specific time-slot openings or availability.

2. Description of the Prior Art

It is generally known in the prior art to provide social networking systems that provide a match based on compatibility of user interests. Social networking systems based on user-generated lists of interests and goals where the contents of the list are prioritized or ranked are also known.

By way of example: U.S. Pat. No. 7,451,161; US Pub. Nos. 2006/0247940 & 2009/0024548 for Compatibility scoring of users in social networking, assigned to Friendster, Inc., describes a method of quantifying compatibility of interests or similarity in interests between members of a social network and providing a match based on the compatible interests. A set of individuals who are within a predetermined degree of separation from a first individual are taken and a compatibility score is computed between the first individual and each of the individuals in the set. Compatibility of the individuals is scored based on compatibility of interests, and these compatibility results and compatibility scores are presented to the individuals. Compatibility scores are linked to interest profiles, encouraging people to enter interests so the site can find other people who share the same or compatible interests.

U.S. Pat. No. 7,502,748 for Job matching system and method, assigned to Careerious Inc., describes a job matching system and method that utilizes personality profiles and candidate interests to match candidates to jobs. Employment position data is received from potential employers and individual candidate data is received from job candidates. The candidate data is compared with the employment position data to create a list of employment positions that match the candidate data. A score indicative of a candidates' suitability for a given employment opportunity is calculated from the comparison of the employment position data and individual candidate data U.S. Pat. No. 7,617,160 for Choice-based relationship system (CRS), assigned to Grove, describes a system to connect event participants with other event participants having similar interests. The event may be a business conference, a cruise, a social gathering, or a virtual event. Profiles are created for the participants indicating preferences and characteristics of the participants. In response to an inquiry from a participant, profiles are compared and matches to other participants with similar interests are generated. This system allows the participants to connect with each other before, during, and after the event.

US Pub. No. 2008/0288494 for System enabling social networking through user-generated lists, describes a social networking method using user generated lists. A list database is generated based on the lists created or populated by users of the system. The list database may also include previously built lists or lists of publications, organizations, or groups. The method includes receiving a first list of items from a first user, receiving a second list of items from a second user. The determination of position of items in a third list includes performing a mathematical computation involving the first value corresponding to a first position of the first item in the first list and the second value corresponding to a second position of the first item in the second list. The third list is then displayed on the computer screen with items in that order. Users can generate a list (e.g., favorite movies) and share the list with others who can then rank the list according to their own preferences. Users can also search or browse lists created by others.

US Pub. No. 2009/0187829 for aggregation and visualization of reused shared lists, describes a shared list social networking system and provides for aggregating and visualizing reused shared lists. An example of a shared list is a rank-ordered list of likes or dislikes. Describes that users can select an existing shared list on a topic, view rank-ordered results, create a new shared list on the topic incorporating users individual rank-ordering of the shared list, and save the new shared list in association with the existing shared list. An aggregation view displays items for each rank or lists items in rank order based on the rankings of multiple users.

US Pub. No. 2008/0162431 for identifying interest twins in an online community, describes a method for identifying members in an online community with similar interests to other members of the online community, and determining if the users are "interest twins". "Interest twins" are members that have demonstrated interest in the same or similar items. Member interests are identified by "interest-actions" such as following a link to a web page, bookmarking a web page, tagging items, playing or downloading videos, etc. Information on "interest twins" is used to enhance the experience of the user, such as ranking or highlighting search results from a search engine based on the interests of a user's "interest twin". This invention does not appear to describe introductions or personal connections with "interest twins".

US Pub. No. 2009/0327270 for Using variation in user interest to enhance the search experience describes a method to enhance the search experience by making the results list responsive to the interests of different individuals and groups of users. The system includes a search interface that determines the variability of search interests (e.g., goals) given queries, and a search experience enhancer. The search interface accepts a query from a user as input, and determines a variability in user interest (e.g. in search goals) for the query.

Furthermore, it is generally known to provide calendar, schedule, or time-based systems and methods using computer software and network or cloud-based access, or shared calendaring. The present invention relates to calendar, schedule, and/or time-based systems and methods using computer software for providing network or cloud-based notification for time slot openings or calendar/schedule availability including providing notification system based upon predetermined social network connections to individuals, companies, and service providers of interest to a participant or user. Users of the system can opt-in to the notification system based upon a click-select activation or hyperlink from an interactive graphical user interface (GUI) on a website accessed through a network, such as the internet.

US Publication No. 20080098313 for System and method for developing and managing group social networks describes a system and method for facilitating the configuration and management of events within a social networking system, wherein members of similar or different geographic locations and/or interests, hobbies, social status, relationship status can interact with the system to view activities, register or participate in those activities and schedule activities; further describes a personal workspace that enables the members of the network to view the personal calendar and the scheduled events and activities, and registration.

U.S. Pat. No. 6,978,246 for System and method for matching entities utilizing on electronic calendar system, assigned to IBM, describes an integrated matching service and calendaring system. In addition to the typical items represented by a calendared event, it utilizes a calendar event to represent an activity, the requirements to match the activity, the entity attributes, and any match results; an entity defines criteria and information for a matching activity, and the information and criteria concerning the activity are represented as a calendar event in an electronic calendaring system; calendar events representing matching activities and criteria are communicated to a matching server via a calendar access protocol, the matching server notifies suitable matches, if any, and notifies the entities involved of the match.

U.S. Pat. No. 7,383,303 for System and method for integrating personal information management and messaging applications, describes a computer-implemented method that identifies a set of contacts and/or contact groups permitted to contact a user of a data processing device during a scheduled event in an electronic calendar; a communication event is received from a first contact over a communication channel and is compared against the identified set of contacts and/or contact groups permitted to contact the user. Further, the user of the communication event is notified during the scheduled event only if the first contact is in the set of contacts and/or contact groups.

US Patent Application Publication No. 20020191035 for Computerized customizable scheduler, which describes a customizable software method for creating and maintaining a scheduling calendar for people and resources in a professional, personal, or service environment, including maintaining and updating a database to augment the scheduling calendar, with extensive reporting functions for planning, management, and marketing functions of an individual or business.

U.S. Pat. No. 7,174,303; US Pub. No. 20020032588 for Customer driven sponsor controlled network based graphical scheduling system and method, describing a method for developing a schedule for a sponsoring organization and includes providing a sponsor controlled customer database containing information relevant to individual customers who periodically need to schedule appointments with the sponsoring organization, a set of sponsor parameters associated with each customer, which define possible appointment times for a customer, and a central controller for displaying and managing a schedule for the sponsoring organization; the system contacts some of the customers concerning scheduling appointments with the available appointment times determined by the sponsor parameters associated with the individual customer via the electronic network, and the system receiving scheduling information via the electronic network from at least some of the customers; may also include a graphical calendar to at least some customers, wherein the customer can schedule an appointment by selecting the icon associated with the desired appointment time; the controller may use email to contact customers, and use the Web to supply available appointment times and receive scheduling information from the customers; offline communication may also be used.

U.S. Pat. No. 5,960,406 for Scheduling system for use between users on the web, describes a system comprising an end user interface that is generated in standard page markup syntax and sent using standard communication protocols to allow users to communicate with the system, delivering the scheduling events to end users of the system, and means for confirming proposed events by the end users; the computer systems include a client interface that allows an initial end user to communicate a desire to schedule an event through the system to potential end users, a transport medium interface for allowing the system to transport proposed event schedules between potential end users of the system and a computer subsystem for generating for the initial end user of the system, a calendar that is adapted to contain the events for that initial client, modifiable when other end users of the system, or that first user messages about events into the calendar of the initial user.

WIPO Pub. No. 2016049555 for an appointment and payment handling system that may operate to handle payments for appointments based on user locations at times associated with appointments. The appointment and payment handling system may determine if a location of a customer device associated with a customer associated with an appointment matches a location associated with the appointment. If the locations match, the appointment and payment handling system may create a payment record for a payment to the merchant from the customer based on the determination that the customer location matches the location associated with the appointment.

SUMMARY OF THE INVENTION

The present invention relates to systems and methods for automatic network-based calendar availability notification and interactive acceptance by users associated with service providers, businesses, and/or individuals.

The systems and methods of the present invention also provide for automated appointment opening notification matching or corresponding to user-indicated availability or lead-time notification for predetermined users associated with service providers, businesses, and/or individuals.

These and other aspects of the present invention will become apparent to those skilled in the art after a reading of the following description of the preferred embodiment when considered with the drawings, as they support the claimed invention.

DETAILED DESCRIPTION

Figure 1:
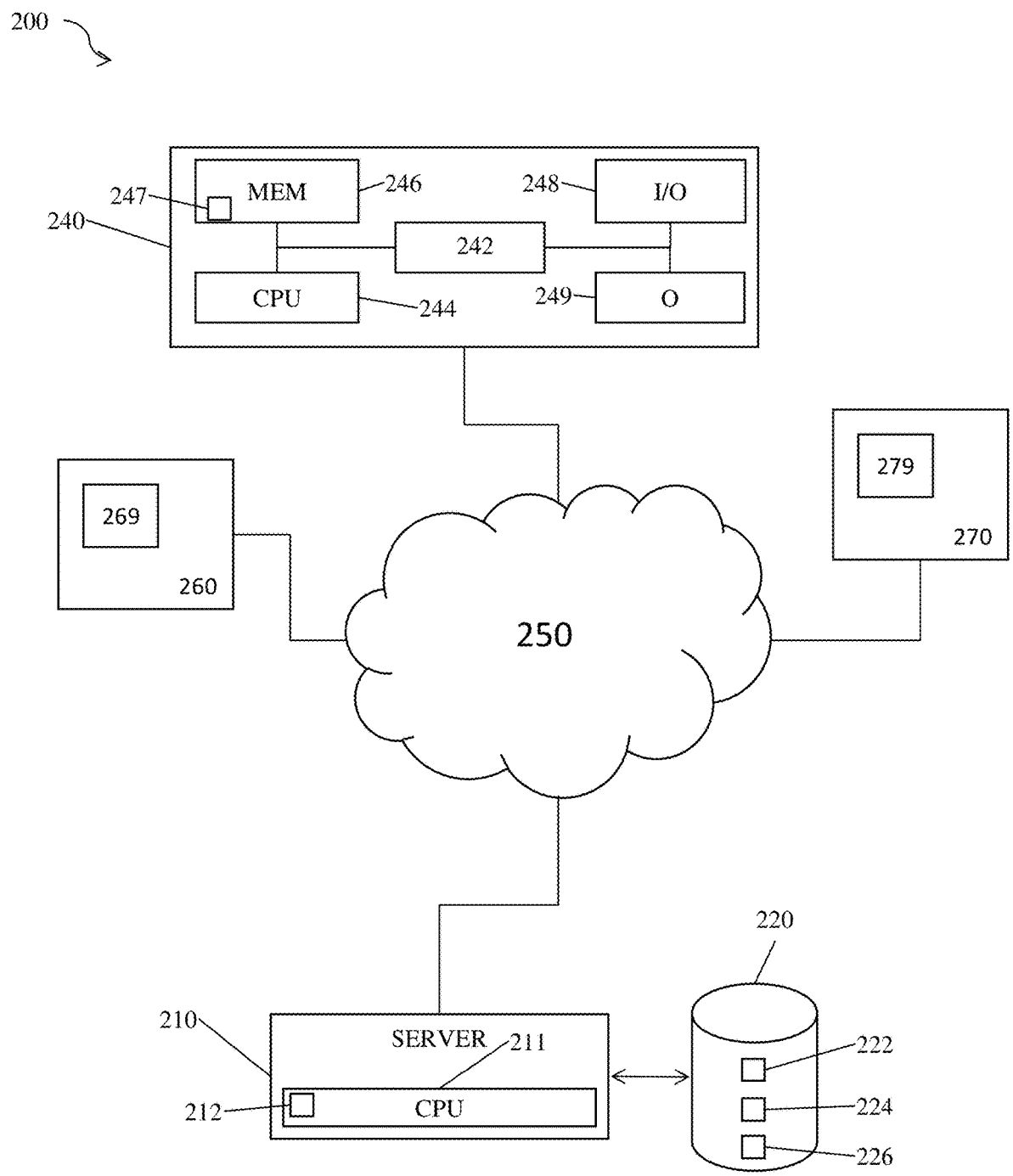
FIG. 1 is a schematic diagram of one embodiment of the invention.

Referring now to the drawings in general, the illustrations are for the purpose of describing a preferred embodiment of the invention and are not intended to limit the invention thereto.

The present invention provides for a systems and methods for network-based calendar availability notification and interactive acceptance by users associated with service providers, businesses, and/or individuals. Much of the prior art takes a focus on matching preferences or interests of users, however no patents or applications fulfill the need to develop a system that matches open appointments with user preferences and availability.

Thus, there is need in the field of appointment management to provide a system that aids in the filling of appointments including at least these features. Appointment creators (such as businesses) can be severely affected by the lack of adequate systems for scheduling and rescheduling customers. For example, cancellations and no-shows can be very costly to a medical office. If a patient cancels an appointment or does not show up, this often leads to a medical office being unable to fill the appointment due to the lead time being too short to commit another patient. Additionally, systems and methods of notifying and enticing customers to keep or make an appointment (as well as analyzing the appointment behaviors of these customers) are necessary developments to the field of appointment management in order to solve a costly problem affecting a multiplicity of different businesses today.

While the prior art is generally focused on either coordinating event times between two parties or marching users to each other to schedule event times independently, the present invention is instead focused on matching users to appointment openings using preferences, availability, external systems, and other resources, in order to efficiently fill appointments and ensure they are kept. Solutions in the prior art have additionally attempted to utilize text messaging or other reminder communication in order to keep patients committed to their appointments. However, while this is one effective tool for keeping loyalty, the present invention advantageously additionally provides calculated rewards and incentives in order to assure that the appointment is kept.

Advantageously, the present invention provides a technology-based solution to appointment matching that is dependent on a network providing real-time or near-real time transfer of data such as the Internet. The inventive concept of a network in combination with the appointment systems, matching engine, and devices of consumers allows for a new, inventive method of online appointment booking and improves upon prior methods of online appointment scheduling. The present invention comprises a specific combination of computer components that provide new, improved methods and systems for appointment bookings. Specifically, the invention provides, inter alia, both the benefit of improved appointment matching on a server side as well as improved appointment management and creation on an end user side. While prior art may describe improvement to calendaring in general, the present invention is directed to improved systems and methods that include hardware components ordered to provide efficient appointment creation, matching, and booking, as well as increased ability to connect multiple users to multiple appointment providers. Additionally, the present invention solves problems of prior art online appointment scheduling that are specific to the field of online appointment scheduling, including use of cryptocurrency/blockchain technology, real-time notifications, and improved software, including the matching engine of the present invention and software specific algorithms, which utilize variables tied to computer technology, including a Preference Correlation Coefficient.

The systems and methods of the present invention also provide for automated calendar opening (or appointment availability) notification matching or corresponding to user-indicated availability or lead-time notification for users associated with service providers, businesses, and/or individuals. Users are either be predetermined (pre-registered with the system for their preferences) or not. Also, preferably the systems and methods are provided for cloud or virtualized systems, such as a web-based hosted solution.

Systems and methods of the present invention are not limited to business-based appointments, schedule or calendar openings, for example, within a social network of a user and his/her associated with friends, the user indicates how much lead time is required in advance of an event in order to receive or accept an invitation.

Preferably, the systems and methods of the present invention automatically and predictively manage notification of calendar openings in multiple dimensions including a time dimension and a priority dimension, wherein users are assigned levels of priority such as first tier, second tier, etc., and wherein notification for time-based calendar openings is provided in order of priority level to matched users within a network (predetermined, opt-in, or opt-out), such as, for example but not limitation a social network.

As shown in FIG. 1, the system 200 comprises a server 210 with a processing unit 211. The server 210 is constructed, configured and coupled to enable communication over a network 250. The server provides for user interconnection with the server over the network using a personal computer (PC) 240 positioned remotely from the server. Furthermore, the system is operable for a multiplicity of remote personal computers or terminals 260, 270 to access the server remotely. For example, occurs in a client/server architecture or alternatively, and preferably, a user interconnecting through the network 250 using a user device such as a mobile communication device, such as by way of example and not limitation, a mobile phone, a cell phone, smart phone, laptop computer, netbook, a terminal, personal digital assistant (PDA), or any other computing device suitable for network connection. Alternative to the client/server architecture, other architectures are used. For example, in some embodiments, a PC network, or other suitable architecture is used. In preferred embodiments, the network 250 is the Internet, or it could be an intranet, or any other network suitable for searching, obtaining, and/or using information and/or communications, including receiving the notification and providing a response.

The system of the present invention further includes an operating system 212 installed and running on the server 210, enabling server 210 to communicate through network 250 with the remote, distributed user devices. The operating system is any operating system known in the art that is suitable for network communication.

A memory 220 is interconnected with the server 210. Memory 220 is either integral with server 210 or external to the server and interconnected therewith. A program of instruction 222 is stored on memory 220. According to an exemplary embodiment, the program 222 is computer executable code for using information derived from usage of a communication network to develop a social network for automated notification of calendar openings or appointment availability, or using existing social networks for distribution of the notification, and then the network users or customer users respond through the system for responding affirmatively or negatively to the notification (accept or decline, accept or non-response is decline, etc.). Alternatively, portions of the program for automatic notification of calendar opening or appointment availability 222 may be installed on a user's computing device 240; however, in preferred embodiments, the system is cloud computing based, with the remote client or customer computer devices merely accessing the system and receiving notification via the web or other network.

A remote user (either service provider or customer user) may connect to the server 210 through network 250 from a computing device 240. According to an exemplary embodiment, computing device 240 is a personal computer. Computing device 240 may comprise a bus 242 interconnected to the network 250 such as through a modem, an Ethernet card, or the like. A processing unit 244 may be interconnected with the bus 242. A memory 246 may be interconnected with the processing unit 244 through bus 242. The computing device 240 may also comprise one or more input/output devices 248, such as a mouse, a keyboard, a printer, and the like interconnected to the processing unit 244 through bus 242. A display 249, 269, 279 may be interconnected with the processing unit 244 through bus 242 for providing a graphical user interface on a display, corresponding to a website, preferably interactive GUI and web site.

Computing device 240 in some embodiments has a program of instruction 247, such as a driver enabling computing device 240 to interconnect with server 210 through network 250.

When the user enters inputs information into the memory 220, the server 210 creates and updates a profile database 222. The server then executes a matching program 224 against the data stored in memory 220, which includes any data relating to the system for all time or predetermined time. The program 224 detects attributes of the usage, and uses those attributes to build the constraints for receiving notification or acceptance of schedule openings 224, such as, by way of example but not limitation, for lead time indications. The server stores the constraints and other data associated with users and profiles of businesses, service providers, and/or individuals and their corresponding schedule or calendar information 224 in memory 220. As will be described in greater detail below, the schedule or calendar opening notification 224 includes concepts (represented by vertices) and relationships (represented by edges) which relate those concepts to the user.

The profile database 222, informs the schedule or calendar opening notification agent 224 to identify concepts of interest to the user, such as, by way of example and not limitation, calendar availability, desired goods and/or services, as well as relationships, areas of interest, etc., and to build a network 226, such as a social network, based on those interests. This social network is either temporal, automatically being disbanded upon some completion event, such as the user completing an appointment, or the user responding positively to a prompt to terminate or initiating a termination request to the social network. Alternatively, the social network remains in effect until proactively terminated by the user. Optionally, other users with common interests are prompted as to whether or not they wish to join the social network, and added only if they take an acceptance action.

Figure 2:
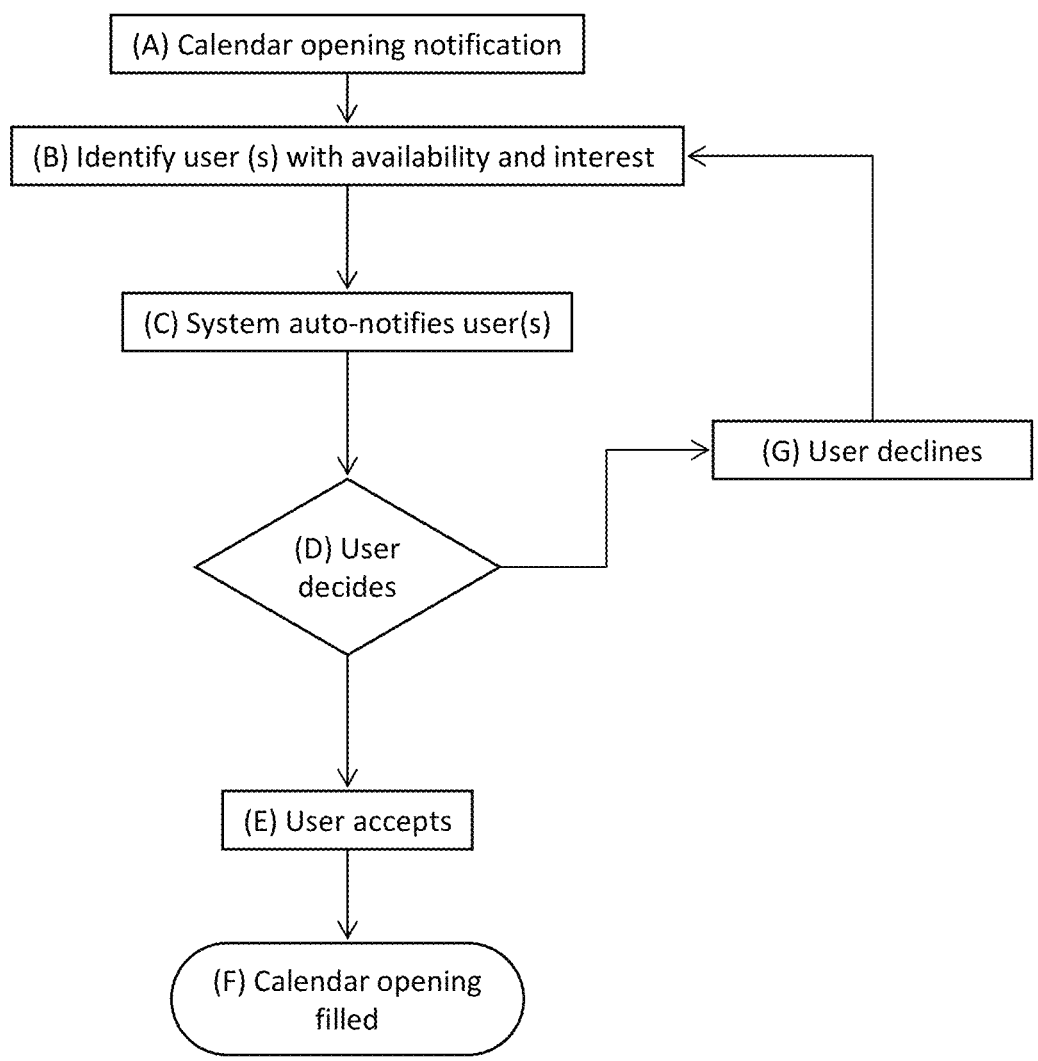
FIG. 2 is a flow diagram of a method according to the present invention.

FIG. 2 is a process flow diagram illustrating a method of automated notification and acceptance/rejection of appointment or opening in a calendar/schedule via network-based systems and methods according to the present invention. Basic method steps include (A) the calendar receiving an opening notification; (B) the calendar identifying at least one user with availability, interest and sufficient lead time to change to the newly-available opening; (C) the system auto-notifying the at least one user of the new opening; (D) the user deciding whether to accept the new opening. If (E) the user accepts the new opening, then (F) the calendar marks the opening as filled; if (G) the user declines the new opening, then (B) the system searches for other available users.

Figure 3:
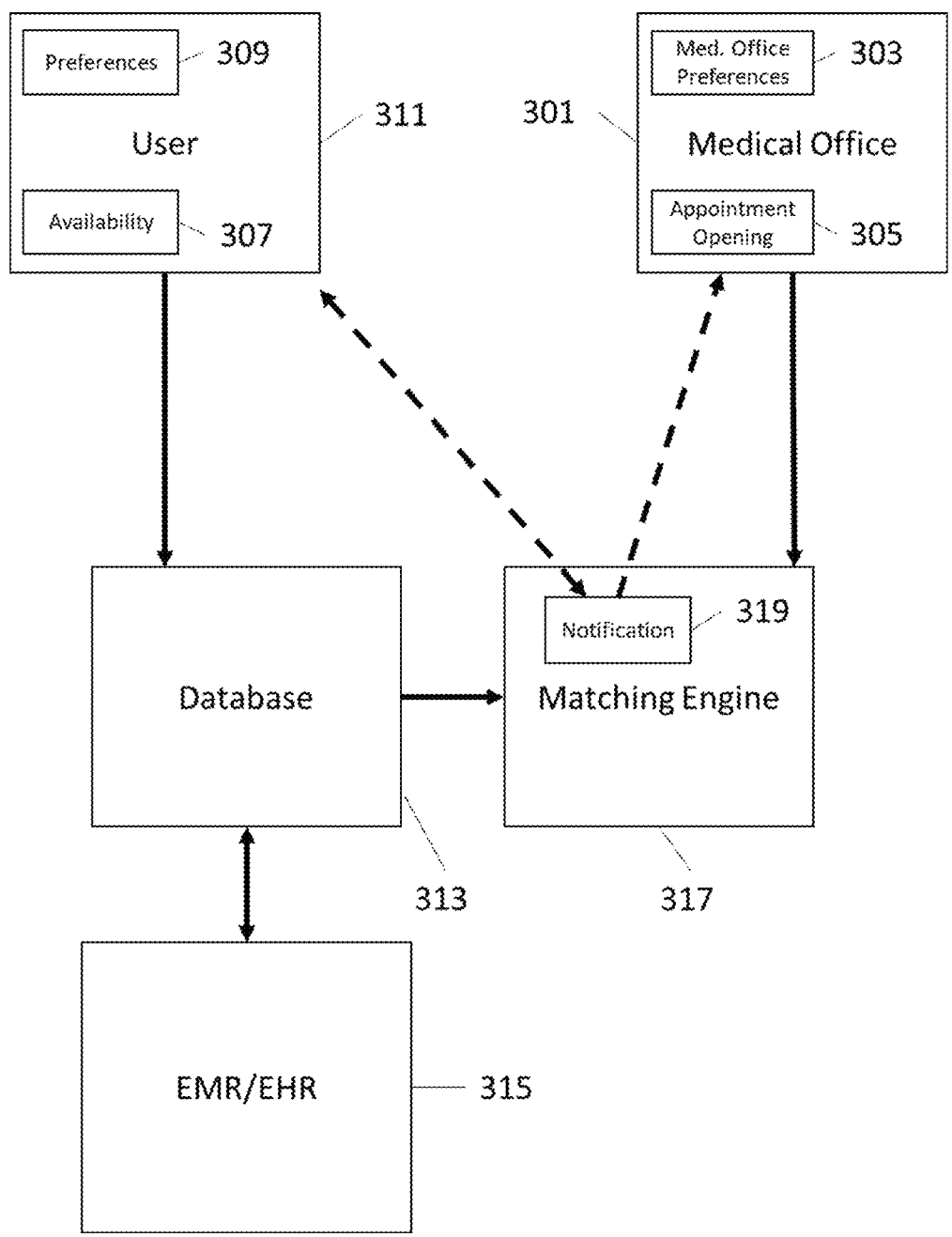
FIG. 3 is a schematic diagram of one embodiment of the invention.

FIG. 3 is an example of one medical-focused embodiment of the matching engine system, wherein the matching engine 317 is operable to receive an appointment opening 305 from the medical office 301 including both medical office preferences 303 describing the appointment and the medical office in order to match with users. A user 311 is simultaneously able to submit user preferences 309 and availability 307 to a database 313. Alternatively, the user has submitted user preferences 309 and availability 307 to the database previously. The database 313 is then operable to query and retrieve information from an external EMR or EHR system 315 in order to corroborate health data with user profiles. The matching engine 317 is then able to retrieve user profile information from the database 313 and match the user profile to the medical office preferences 303 and appointment opening 305. When the matching is completed, the matching engine 317 is further operable to send a notification 319 to a user with a notification of a matched appointment opening 305. Upon acceptance of the appointment, the matching engine sends a second notification 317 to the medical office 301 indicating an appointment match. The medical office 301 next has the option of confirming the appointment or cancelling the appointment. If an appointment is confirmed, the appointment opening 305 is updated to indicate a filled appointment. If the appointment is cancelled, the appointment opening 305 remains the same, the user 311 is notified by the matching engine 317, and the matching process restarts. The embodiment is just one example of the system in order to show the key points of the invention. In some embodiments, the components include additional elements that help to provide communication and connection to the database 313 and matching engine 317, including servers, processors, or cloud networks.

Figure 4:
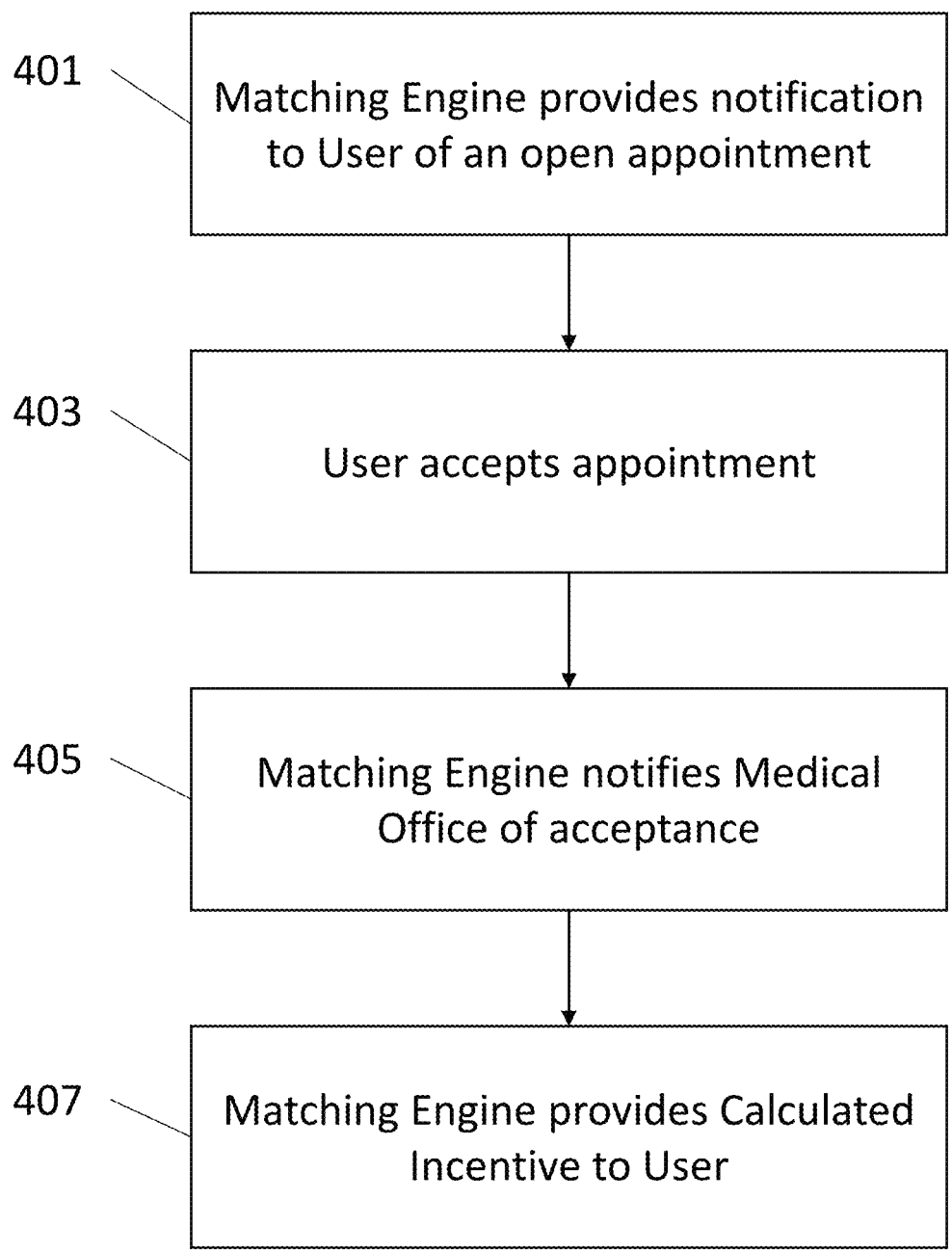
FIG. 4 is a flow diagram of one embodiment of a reimbursement method according to the present invention.

FIG. 4 is a flow diagram of one embodiment for a medical-focused method of the present invention wherein a matching engine provides notification of an appointment to a user 401. The user accepts the appointment 403, the matching engine notifies the medical office of acceptance 405, and the matching engine provides a calculated incentive to the user 407. The calculated incentive is based on at least one of: lead time, type of appointment, cost of appointment, user preferences or a user profile, service provider preferences or a service provider profile, demand for appointment, number of appointment openings, or compatibility of user and service provider preferences.

In one embodiment of the present invention, the systems and methods provide for an automatic notification of a calendar opening from a service provider to the server, wherein the service provider has preferably established an account with a profile that is stored on the database (this preferably follows a basic registration process, including account identification (or username) and corresponding passcode that uniquely identify each service provider). Similarly, customer users register with the system through the internet from a remote computer device or smartphone, computer tablet, etc. Customers have additional options to designate in the user profile in addition to account identification (username) and passcode, including but not limited preferred notification means, such as by SMS or text message, email, pager, mobile phone contact, interactive voice call, automatic calendar request, and combinations thereof; lead time notification requirements (which can vary, depending upon the type of service provider and/or services), and can be selectively modified by the customer user to reflect schedule changes by day, week, month, or random changes in situation and response time; level of priority requested, which can be based upon fee structure, e.g., higher fees for higher priority and first notification and exclusive response period, etc.; opt-in or opt-out matching, which can vary based upon type of service provider and/or services.

Customer users can register with the system by click selecting on a calendar opening notification within the website of the service provider user, or by registering directly with the system and then providing inputs for notification requirements or restrictions in the user profile database. Or a service provider is able to enter existing clients into the system. Social network connection, e.g., via facebook.com, gmail, etc.

Another embodiment allows for a user to place an appointment request to the system or to one or more service providers. Based on the user's profile, preferences, and other user information, the service provider can offer an appointment time slot. In a further embodiment, the system provides a Preference Correlation Coefficient (PCC) to one or more service providers indicating a value of how well matched the user and user preferences are to the service provider and service provider preferences. From there, the service provider is able to manually add the user to an appointment or have the system automatically add the user to an appointment.

In one embodiment, the PCC formula and parameters are set and calculated by the matching service entity. In another embodiment, the appointment creators, such as a business, set and calculate the PCC. A PCC formula is comprised of several quantifiable factors and factor weights, both based on profiles of users and profiles of matching entities, including at least one of: availability, preference for a provider or time, priority, cost of appointment, method of booking, lead time, priority of user, membership status, past response time of users to notifications about open appointments including notifications via email, social network communication, text, phone call, and other networked based notifications, social networking activity relating to the appointment creator or other appointment creators such as competitors, wherein social networking activity includes posts relating to appointment creators, recommendations for other users in the social network to "like" a page relating to appointment creators, patterns of online "checking in" to appointment creators, sharing photos of appointment creators and/or their goods or services, etc. Alternatively, the factors are similar or equivalent to the factors above and are based off of a standalone appointment scheduling platform with similar technological features to that of a social network, including a multiplicity of devices connected over a network and a server computer with real-time or near real-time communication, such as the system described in FIG. 1. For example, one formula to calculate the PCC is dividing the total number of preferences that are similar between the appointment creator and the user by the total number of preferences that are dissimilar between the two parties. This ratio is then presented as the PCC. In another example, the total number of preferences that are similar are added together and presented as the PCC.

PCC Formula Example

The following formula describe one embodiment of a PCC calculation based on four preferences and corresponding weights.

$$\frac{\sum [\text{Weight}] \times [\text{Similar Preference}]}{\sum \text{Weights} \times \text{Total Number of Preferences}} = PCC \qquad (1)$$

User 1:

$$\frac{(1)\text{Availibility} + (3)\text{Cost}}{(1)Availibily + (3)\text{Cost} + (3)\text{Lead Time} + (2)\text{Response Time}} \qquad (2)$$

$$= \frac{1+3}{1+3+3+2} = \frac{4}{9} = .44 \qquad (3)$$

User 2:

$$\frac{(1)\text{Availibility} + (3)\text{Cost} + (3)\text{Lead Time}}{(1)Availibily + (3)\text{Cost} + (3)\text{Lead Time} + (2)\text{Response Time}} \qquad (4)$$

$$= \frac{1+3+3}{1+3+3+2} = \frac{7}{9} = .78 \qquad (5)$$

PCC of USER 2 is greater than USER 1, so the appointment creator offers the appointment to USER 2. Alternatively, the appointment creator is able to set a matching filter to remove users with PCCs below a specified threshold or to manually determine whether to offer the appointment based on a per-user PCC basis.

The system is further operable to connect to outside sources through a network, either through Ethernet (TCP/IP, UDP, etc.), WIFI, cellular networks (LTE, CDMA, EVDO, etc.), fiber optics, satellite, or any other connection method known in the art of networking technology. In one embodiment, the system connects to an outside database (for example an Electronic Medical Records (EMR) system), reads the data on the system, downloads or copies the data to a local memory with a database, and then uses the database to match appointment creators with users.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc. and is implemented on a cloud-based or virtualized network system.

Furthermore, in another embodiment, the invention is a computer program product accessible from a computer-usable or computer-readable medium providing program code for use by or in connection with a computer or any instruction execution system or device. For the purposes of this description, a computer-usable or computer readable medium includes any apparatus that can contain, store, communicate, propagate, or transport the program for use by or in connection with the instruction execution system, apparatus, or device.

In one embodiment, the foregoing method is realized by a program product comprising a machine-readable media having a machine-executable program of instructions, which when executed by a machine, such as a computer, performs the steps of the method. This program product is operable to be stored on any of a variety of known machine-readable media, including but not limited to compact discs, floppy discs, USB memory devices, and the like. Moreover, the program product is in the form of a machine readable transmission such as blue ray, HTML, XML, or the like.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

Referring now to the examples, in general, these examples are for illustrations for the purpose of describing a preferred embodiment of the invention and are not intended to limit the invention thereto.

Example 1: Medical Services

For a medical office, wherein appointments are calendared for at least one physician, such appointments being provided on an electronic calendar or schedule that provides inputs to the systems and methods of the present invention via a network, such as the internet, these inputs including a listing of at least one appointment availability or opening within the calendar of scheduled appointments for the at least one physician. Due to the appointment calendar, there may be a few weeks or even months before the next available appointment exists, until or unless there is a cancellation. There may be a wait list of appointments for next available appointment, such as for the case of a cancellation. In other cases, a list of patients and corresponding patient profiles are stored in a database. A patient's profile includes information supplied by a patient and/or downloaded from an EHR or EMR system, including scheduled appointments, medical records, practitioner notes, Personal Health Records (PHRs), preferred practitioners, and other health information factors. In one embodiment, a system for matching open appointments to availabilities includes a combination of at least a processor, server, and database establishing a connection to an EHR or EMR system in order to download information to formulate a patient's profile in order to facilitate the matching. The system correlates medical office preferences and requirements attached to an appointment opening through the medical office with user preferences from patient profile. The system then determines a Preference Correlation Coefficient (PCC) that includes an indication of how well correlated a patient profile is to an appointment opening. Based on multiple users' PCCs, the system then determines at least one patient to offer the appointment to.

In another medical embodiment, the wait list of patients or users who have matched, connected, or associated with the at least one physician, each with an indication of lead time required to receive notification and accept same for an appointment, is provided within the system and stored within the database, and the system does an automatic search for matching patients and physicians. Upon receipt to the appointment match system and automatic notification engine of the present invention, the system automatically identifies which, if any, users associated with the at least one physician have matching lead time required to receive notification of the calendar/schedule opening. For a match, the system automatically sends an electronic notice, via email, text message/SMS, or phone to the user. In one embodiment, the notice includes a predetermined response period during which a period of exclusivity for accepting the appointment, time slot, or calendar opening is offered. After such a predetermined response period as expired, or upon rejection response from the first user notified, the system automatically provides notification to a second user, or a group of lower priority users. This is repeated until and unless acceptance of the time slot, appointment or calendar opening is filled or satisfied. Variations from this example apparent to one of ordinary skill in the art have been deleted herein for conciseness and are hereby included without departing from the scope of present invention.

External connections additionally comprise connections to insurance databases. In one embodiment, the system establishes a connection to a database of insurance providers and determines coverage related to a location, time, type of care, etc. This information is then used to either suggest appointments to users or to filter appointments that are not applicable to a user. Additionally, in another embodiment, medical offices use this data to choose which insurance providers will be accepted with a particular appointment. In a still further embodiment, users are able to input which insurance provider he or she has. This information is then added to an internal database for the system or a user profile and is used in the matching process.

The present invention also contains applications to telemedicine or telehealth, wherein practitioners are able to provide care to patients remotely, for example over the internet. In one embodiment, when a patient wishes to make an appointment with a telehealth organization, the he or she is able to input user preferences and availability into his or her profile, which then is matched to appointment openings and medical office preferences from practitioners. The patient user preferences in this embodiment are built to include at least symptoms input by the patient, a preference to traditional healthcare or telehealthcare, and any communication details necessary to establish a telehealthcare connection. The system is then able to match and communicate symptoms to doctors or health professionals who are able to see and treat the symptoms. Patients are connected to healthcare providers through video calling technology (e.g. traditional video conferencing platforms such as SKYPE, GOOGLE HANGOUTS, FACETIME, HOUSEPARTY, or Telemedicine-focused platforms, such as VSEE, EVISIT, 2ND.MD). The profile information, meeting content, and video conferencing is encrypted or similarly protected in order to meet the standards of HIPPA regulations or other medical/telemedical regulations. Factors for matching users to telehealth or telemedicine appointments include availability of sufficient high speed internet connectivity or other network connectivity including 3G or 4G network connectivity for defined time periods. By way of example and not limitation, a patient has high speed internet connectivity between 10 am-4 pm but not at other times. Thus, the patient would not be offered an appointment at times during which they do not have high speed internet connectivity. The system is then operable to allow patients to either sell or trade appointment slots across a network or through the system for a financial or other compensation.

Example 2: Personal Services

Personal services include hairdresser, massage, salon, and the like. Notifications for these appointment or calendar openings are made as a result of a cancellation, or as a result of an opening that is not filled. These notifications are likely first made on the basis of lead time notification, but also optionally include geographic considerations of the customer users. Note also that discounts are able to be included if lead times are short, even where the notifications are made or not made on the basis of priority. Also, automatic notification continues until the calendar opening is filled, with discounts being optional and being time-triggered, so that as the lead time decreases, when it reaches a predetermined point, then a discount is offered; multiple or higher discounts are able to be included as the lead time decreases.

Example 3: Restaurant Reservations

Similar to the other calendar opening automated notifications of the present invention, notification of restaurant reservations is made to those matches between customer users (based on lead time, geography, priority, etc.) and service provider users. However, in the case of restaurant reservations, since the lead times may be much shorter (cancellations, etc.), it may be that the customer users are actually other service provider users, such as hotels, wherein the concierge then provides notification to guests (second tier customer users) within its network (those registered with the hotel that evening, or scheduled to be registered at the hotel on a future evening corresponding to the restaurant calendar opening). In this way, the calendar opening notification system and methods of the present invention provide for integration with other calendar inputs, such as guest reservation systems, for notification of the guest directly by the system (if they are a registered user) or for notification to the hotel and then by the hotel to the guest (the end customer user).

Example 4: Entertainment Event or Live Performance

In the case of an entertainment event or live performance, issues with ticket or seating availability may exist; since each ticket or seating availability is associated with a specific time and location, it is able to be considered similarly to any other calendar opening or appointment availability. Also, it may be associated with a predetermined number of tickets for an event occurring at a predetermined time/date and location, or for a series of time/date and locations. Priority notification is known in the relevant art, such as for reserve ticket ordering or sections for season ticket holders, or for select members of associations, such as credit card holders of a certain type (AMEX Platinum). However, the present invention addresses the situation wherein the assessment of calendar opening for non-predetermined tickets or seating availability, i.e., wherein there remain unsold tickets that were not set aside or reserved in advance. These may be randomly distributed with respect to cluster, date/time, location, and/or proximity to the stage or other preferred seating arrangement Prioritization or priority level associated with the customer users is able to be established by the customer user themselves through self-identification as priority level user by paying a fee or registering in another manner with the system overall via the profile database and server, or directly with service providers, or earning the priority status, being selected for priority status by the service provider, or combinations thereof. In the case of overall priority, the customer user is given a higher priority over non-priority level users, or lower level priority customer users of the system, and receives notifications in advance of other customer users (fees or other factors are able to factor in and reflect the amount of lead time, the amount of exclusive response time, etc., which is measured in minutes or days). In the case of priority directly established with the service provider users of the system, the notification of calendar opening is indicated by the service provider user to the system, and also includes a notification priority established by the service provider, which the system automatically registers and follows until the calendar opening is accepted. And in the case of combination, wherein there is both a direct priority established with the service provider user by the customer user, and there is a customer-established priority overall within the system, then first the prioritization established by the service provider is followed by the system, and then if the calendar opening or appointment is not filled, then further notification is made according to the system priority, which takes a secondary priority level behind the service provider notification prioritization, according to preferred embodiments of the present invention.

The system and methods are further operable for cross-market features as well, wherein the matching engine recommends one or more services related to user preferences or activities apart of a user's profile. Based on a user's acceptance or attendance of a first appointment, the system then queries to find at least one second appointment with preferences and information similar to those of the first appointment. For example, in one embodiment, a user attends a primary care appointment and is referred by the doctor to a dermatologist. The patient and/or doctor is able to use the matching engine to find dermatologists in the area who are able to see him or her within a set timeframe based on the user profile.

Additionally, the system of the present invention is operable to suggest cross-market appointments based on a user's interactions with other appointment entities. In one embodiment, a mobile application or website suggests appointments similar to entities that the user previously has viewed, interacted with, or created an appointment through. The suggestions are generated based on either an analytics engine that records a user's interactions through the system or based on a user profile, wherein a user indicates markets he or she is interested in.

Advertisements are also able affect the cross-market matching, wherein an advertiser pays to advertise appointment openings to users who meet certain criteria. These criteria include at least: interaction with at least one competitor, an interest listed in a profile, interaction with an advertisement, physical proximity to a business or appointment entity, or any other indicia known in the field of targeted advertising.

In addition, the present invention is capable of notifying users to schedule a follow-up or recurring appointment as well as automatically schedule appointments. If a user attends an appointment regularly (e.g. on a weekly basis), this information is manually or automatically added to the user profile, the system initiates the matching process on the user's availability and user preferences for an appointment at the recurring appointment entity, notifies the user of the appointment opening, and offers to schedule the appointment for the matched appointment. The system is also operable to match and book the recurring appointments automatically based on a user referencing for autoscheduling. Preferably, the autoscheduling is done through user analytics, where a user's interactions with an appointment entity and recurring actions are analyzed through machine learning and predictor engines in order to determine which appointments are recurring. Furthermore, if a user wishes to attend a follow-up appointment, the appointment entity or the user requests a follow-up appointment time through the system. The system then matches the user to an appropriate appointment at the same location based on the user profile and appointment entity preferences. The appointment is determined through parameters added to either the user profile or the appointment entity preferences, including at least one of: a time period until a next appointment, a range of preferred time or dates, and preferences specific to the appointment entity (e.g. a medical professional or a specific band performance).

Social network development within the systems and methods of the present invention are established by customer users directly or indirectly, by registering selectively with predetermined service providers within the system (offered by selective inputs registered by the system from remote customer users and modifiable at any time by those customer users, such as by click select through GUI website, dropdown select menu, etc.) or by agreeing to be notified for any service providers within the system for predetermined categories of services within predetermined geographies and/or times. Also or alternatively, service provider users input pre-existing customer users into the profile database, which is operable to be closed or open to those service providers only. The customer users are also able to agree to be open to any and all service providers of specific types within a predetermined geography. Alternatively, where the customer users and service provider users are all "friend" or "business" users within a social network, if the customer and service provider users have been previously connected in a social network of friends or professional contacts, then they may be open to invitations to events so long as those notifications match requirements of lead times of the customer users. Note that in this case, the service provider users are the "asking" or "inviting" users, and the customer users are the "accept" users. These invitations include invites to social events, dates, parties, meetings, etc. and combinations thereof. Other matching requirements include those pre-existing or those selectively indicated and input by the customer members at any given time within the system. Additionally or alternatively, entire social networks or subsets thereof are able to be introduced if an organization joins or provides priority access to its members, for example, through an agreement with at least one service provider, or with the system management agent.

The methods and systems are also operable to allow users and businesses to share appointments through a social network in order to communicate availability or share an experience. Profiles therefore are able to include user preferences pulled from social media, such that the public or private information stored by a user in his or her profile is automatically fetched and indexed in the appointment database or memory. In one embodiment, the appointment system is connected to a user profile through a "social login" or connection to the website. The social login is implemented either on the system itself, wherein a user logs into the appointment system using a social network account, or through the social network, wherein a user signs up for an appointment and creates a profile through a business's public social media page.

A social networking profile allows for multiple user preferences and user information to be easily and efficiently stored in a user profile for appointment matching. A social networking profile often includes many preferences and identifying information that is able to be used to match appointments. These preferences and information include at least one of: a name, age, date of birth, interests, disinterests, location, availability, social connections, social interactions, and any other profile information that is known in the art of social networking. In one embodiment, the user grants access to the appointment system to retrieve profile information from the social network. The appointment system then retrieves the information from the social network, stores the information in a database, then uses the matching engine to match the user to open appointments. Advantageously, the system is able to use the benefits of the social media platform as well as the benefits of a user profile database paired with a matching engine in order to provide an improved appointment matching system that was not possible before the Internet.

Business-Focused Social Media Implementations

In one embodiment, if a business is hosting an appointment availability, the business's public page on social media automatically "posts" a description of the availability and preferences and/or provide a link or interactive element for users to sign up for this appointment. In one embodiment, this is accomplished through a virtual "button" on the page that either registers a user automatically in the appointment through a single click ("1-click") or through following the button to an external appointment system. For example, a movie theater implementation would allow for theaters to advertise a movie showing on a web site or social media platform, through which users would be able to instantly purchase a ticket to the movie through the website. The system is further operable to suggest movies to users based on profile information. For example, if a user interacts with, lists an interest in, or "likes" a movie, genre, or theater on a particular social media platform, the appointment system is able to recommend to the user a movie showtime to attend based on these preferences and offer a method for purchasing a ticket.

User-Focused Social Media Implementations

A registered user is additionally able to interact with the system through social networking means, wherein a first user is able to "share" his or her appointment online. Other users who are connected to the first user are able to see the first appointment shared by the first user, interact with the appointment to create a second appointment, offer a trade in appointment time, offer financial compensation for purchasing the second appointment, and/or share or invite social connections to interact with the second appointment. For example, if a user has a reservation for a dining location but cannot make the appointment, he or she is able to share the event through the system to social media. Social connections to the user are able to see this post through the social network, and a second user is able to offer to take the reservation from a user. The second user would thereby be able to interact with the "share" or "post" in order to submit a financial or trade offer. The offer includes at least one of: a message, preference information, profile information, an offer for an additional appointment to trade, a financial compensation, or some other form of compensation, such as a coupon or physical reward. Alternatively, the second user is a service provider user and the second appointment is an appointment offered by the service provider user.

Sell/trade access to the calendar opening; this applies to all types of transferable appointments or calendar openings, including but not limited to professional appointments, service appointments, personal services, tickets, events, food or other reservations, airline seats, etc. Since there is a value on each side the calendar opening "owned" by the customer user who accepted it first is the potential "seller" and the other customer user(s) who have an interest and value to exchange for the calendar opening are would be "buyer(s)" of the calendar opening or time slot. Where the seller has more time flexibility, and the buyer has less time flexibility or greater interest in reduced lead time to appointment or calendar opening, there is more value to the buyer for that priority time slot, appointment or calendar opening. A secondary notification system and methods exist in parallel to or subsequent to the primary notification system as described and set forth hereinabove. In preferred embodiments, this secondary notification system and methods are established either directly between customer users or between customer users indirectly through the server on a secondary level. In the case of an acceptance by a first customer user of a calendar opening, wherein that first user has increased flexibility of schedule but would like to have other offsets or compensation or other reward in exchange for conferring the now accepted calendar opening to a second customer user, there is an exchange system and methods that provide for the transferability of the calendar opening. Other customer users (apart from the first user who accepted the calendar opening) can request the calendar opening; a notification of this exchange request is delivered automatically to the first user, unless the first user has provided within the profile database (either overall or selectively for that calendar opening that was accepted) that s/he is not willing to make an exchange. The first user can selectively accept or decline the request from the other customer user(s). This request is made either directly or indirectly; it also is accompanied by an exchange offer or there is a bid process that downselects the top other customer user(s) based upon bid level and notification lead time requirements of those other customer user(s). In another option, the first customer user who accepted the calendar opening is able to release a notification for exchange to the system server via the network, indicating that s/he is flexible with schedule, and would like to solicit bids or offers to exchange from other customer user(s) who have indicated that they are willing to accept such secondary notification, or if they have not opted-out from receiving such notifications.

The present invention is also directed towards solving the problem wherein appointment creators at businesses and other entities often pay a significant opportunity cost and face lost revenue when a user cancels an appointment. Prior art has focused on using messaging systems to remind users to attend appointments. While this solves the problem of users forgetting appointments, it does not address the problem of users actively choosing not to attend an appointment. For example, a patient who has not been to the dentist for a period of time either because of a traumatic experience or fear of dentistry may be afraid of returning to have an appointment. Therefore, systems and methods are operable to provide compensation for accepting or keeping an appointment. When a user accepts an appointment or attends an appointment, a Compensation Engine uses elements including appointment entity preferences, user preferences, user interactions, lead time, and/or other variables to determine a Calculated Incentive (CI) to provide to the user for either attending an appointment or accepting an appointment invitation.

The CI is a financial value calculated in units of any currency, including fiat money, cryptocurrencies, and virtual currencies. In one embodiment, the CI formula and parameters are set, calculated, and paid for by the matching service entity. In another embodiment, the appointment creators, such as a business, set, calculate, and pay for the CI. In a third embodiment, the matching service entity sets and calculates the CI, and the appointment creators pay for it. For example, one formula is based on a percentage of the appointment cost. For an appointment that costs $500, a CI can be set to be equal to 10% of the appointment, which would equal $50 (or equivalent amount in another currency). In another example, the CI is calculated based on how short the appointment lead time is. If the CI is set to be inversely proportional to lead time, such as increasing $5 per day after an appointment cancellation leading up to the appointment time, and a user accepts an appointment two days after a cancellation, the CI would be equal to $10. Thus, the CI is dependent upon to the amount of time until the appointment opening. In an additional example, an open appointment that is 1 day away includes a higher CI than an open appointment that is 1 week away. The CI formula includes a linear increase in the value of the CI, an exponential increase in the value of the CI, or is based on any other known mathematical relationship between value and time. Preferably, the CI has an upper limit.

Advantageously over prior art, the present invention allows for a CI to be set and calculated by appointment creators or the matching service. While prior art only focuses on providing general incentives for completing an action, the present invention allows that number to be quantified and calculated in order to provide greater incentive to the users as well as profitability for the appointment creators or matching service entity.

Other incentives for accepting an open appointment include non-monetary compensation, such as a priority in future notifications regarding open or cancelled appointments or a free or reduced cost cancellation of an appointment in the future. In another embodiment, incentives include industry specific rewards. By way of example, in the dental industry, a dental office is able to offer a patient who fills an open appointment through the system a complimentary product such as extra whitening strips, toothpaste, floss, electric flosser, electric toothbrush, etc.

The system is further operable to store information relating to appointment creation, acceptance, invitation, and cancellation in a memory. The information is collected either during a transaction (e.g. an appointment acceptance) or in real-time as users interact with the system. This information is then transmitted either to an analytics engine for improving the system and/or is inserted into user profiles in order to more effectively match user profiles to appointments.

Information stored for analytics further include an indication of the lead time before an appointment that was interacted with, a calculated value of the appointment (including a CI value, a cost of the appointment, etc.), and a number of users who interacted with the event. Further embodiments associate the interactions with the user profiles. In another embodiment, this data is encrypted such that it is anonymously tied to user data and user profiles. In this way, the privacy of the users is protected in order to comply with regulations (e.g. HIPPA) or simply to assure no private information is released to parties whom the user did not release information to.

In other embodiments, a user profile is developed through the syncing of a personal or professional calendar. The system provides a method for users to grant access to a personal calendar and use the "free" time in the calendar to determine the best available appointment times based on the matching engine. For example, a user on a website embodiment logs into a GOOGLE account through a social login and grants access to his or her GOOGLE CALENDAR. The system then stores the events on the GOOGLE CALENDAR and uses this as one of the availability factors when matching an appointment.

The system and methods of the present invention are preferably not limited to business-based appointments, schedule or calendar openings, for example, within a social network of a user and his/her associated with friends, the user indicates how much lead time is required in advance of an event in order to receive or accept an invitation.

The present invention also allows for an Application Programming Interface (API) to be implemented with the system such that outside entities are able to manage appointments, add appointments, search appointments, advertise, or otherwise perform functions of the system on other platforms or devices. For example, a personal calendaring application is able to interact with the system as a client in order to add, sync, and establish communication through an external calendaring service. In this way, a user is able to use his or her own personal calendar app that he or she is accustomed to in order to accomplish similar functions to that available on the main website, app, or other system embodiment.

The present invention also allows for external connections and requests to external databases and systems, such as an EMR or EHR system or a social network database. In one embodiment, the system is granted access to the external system. The system then retrieves information from the external database (e.g. medical and health records), stores this information in user profiles, and uses the user profiles to match appointment openings to user availabilities and preferences. In some embodiments, tags, XML data, or other digital structure information is stored in the database and matched directly to user profiles. In other embodiments, the structured data is converted or tagged with secondary structure information to be used in the profile database. Advantageously, the external connection to a database allows for personalized appointment matching that was unavailable before the Internet. Since medical records did not include tags, structure, or other computer elements that are included in electronic medical records, appointment matching based on this data was impossible.

Also, preferably, the present invention systems and methods for provide for automatically and predictively managing notification of calendar openings in multiple dimensions including a time dimension and a priority dimension, wherein users are assigned levels of priority such as first tier, second tier, etc., and wherein notification for time-based calendar openings is provided in order of priority level to matched users within a network (predetermined, opt-in, or opt-out), such as, for example but not limitation a social network.

In one embodiment, the present invention allows for communication between the appointment entity (such as a business) and the appointment holder. For example, a user who creates an appointment is able to message the appointment entity to inquire as to preparations for an appointment or to check the time of the appointment. Conversely, an appointment entity is able to communicate to the user the start time of the appointment, preparations necessary for the appointment, or availability of other appointment times. In one embodiment, the communication is setup to automatically occur at a set time interval before the appointment. In another embodiment, the communication happens manually when initiated by a user or appointment entity. Communication is accomplished through at least one of the following methods: physical "snail" mail, email, instant messaging, text messaging, picture messaging, push notification, proprietary messaging systems, an application on a mobile device, or combinations herein.

By contrast to prior art calendaring, the present invention provides for the users or customers to enter his/her geographic zone and requesting the appointment or calendar availability. The system also preferably provides for a retraction option, or the ability to pull-back or undo appointments or notifications of opportunities for calendar opening.

By way of example but not limitation, for a 4 weeks out appointment, the system provides for an automatic notification to all users indicating availability at less than 4 weeks out, but based upon appointment type, availability, etc., and also optionally based upon priority or status of the user within the system. Thus, the system has an automated intelligence for automated appointment fulfillment with predetermined prioritized candidates based upon the user-determined or user-defined factors input to the system. So then there is a shuffling function that is also automatic, if a first appointment by a first user is replaced with a second appointment by a second user following the cancellation by the first user for the first appointment, then now the second appointment is a new slot open for anyone available within those constraints, and in this case the first responder that is accepted by the system is the second user, who has secured the second appointment, etc.

Location features of the present invention include sensing whether a user is within a geographic zone or boundary in order to offer an appointment to the user. For example, a user who is near a dining location would be notified of table availability within a predetermined time. The location is sensed through at least one of the following methods: entering a geofence, being within Bluetooth connection range, being within a WIFI connection range, being within a predetermined geocoordinate points, being within a graphically perceivable distance of the entity, using a Global Positioning System (GPS), IP address location services, cellular triangulation, user entry of location, and/or any other technological location services available in the art.

In another embodiment, the present invention uses push notifications to alert users about appointment availability in a geographic zone. The user enters preferences into a program or mobile app, including by way of example and not limitation, a time frame, a minimum and maximum cost, a wait time, average review across one or more review platforms (e.g., YELP, TRIPADVISOR, FACEBOOK, GOOGLE, and/or an internal review system for the scheduling platform), and a geographic zone defined by a radius from the user's current location, a city, a town, etc. In one embodiment, the geographic zone is defined by determining the user's current location. The geographic zone is also defined using other criteria in other embodiments, including the confines of a shopping center, the availability of public transit to transport the user to an appointment in a timely manner, etc. In one example, a user is interested in hair services within a 10 mile radius of the user's current location within the next two hours with the hair services having a minimum price of $30 and a maximum price of $50. The user enters this information into a mobile app or software program, which includes a locally stored computer app or a web-based application and subscribes to push notifications from the app for appointments within the next two hours. The app communicates with one or more server computers or distributed devices to determine availability of hair appointments according to the criteria. Upon one or more merchants indicating availability of a hair appointment via a merchant device, which is in one embodiment a server computer or distributed device, a push notification is sent to the user via an app notification, an SMS or text message, an email, a phone call, and/or any other technological communication method. The push notification includes a mechanism to schedule an appointment, such as by clicking or selecting a hyperlink, selecting a button on a phone interface, replying to an email or text message, etc.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for automated filling of calendar appointments on the Internet comprising:
    at least one server having a memory, a processor, a database, and a matching engine connected over the Internet to at least one device of at least one customer user and a service provider device:
        creating a social network profile in the database for the at least one customer user by querying outside databases or memory systems for information relating to the at least one customer user;
        receiving a notification of a calendar opening from the service provider device;
        matching the at least one customer user to the calendar opening based on the social network profile of the at least one customer user and service provider preferences;
        automatically sending a notification of the calendar opening to the at least one device of the at least one customer user;
        the at least one server receiving an acceptance of the calendar opening from the at least one device;
        wherein information about an appointment associated with the calendar opening is operable to be posted on a social network;
    wherein the posting on the social network provides interactivity relating to the appointment including receiving offers from other users for the appointment including a trade of another appointment for the appointment or compensation for the appointment and interactivity to create a second appointment based on the appointment;
    wherein the compensation for the appointment includes a cryptocurrency compensation;
    wherein matching the at least one customer user to the calendar opening based on the social network profile of the at least one customer user and the service provider preferences is performed based on a Preference Correlation Coefficient (PCC), wherein the PCC includes a match value between the service provider preferences and preferences of the at least one customer user, and wherein factors on which the PCC is based are weighted, and wherein the PCC is based on user preference for the service provider, user preference for calendar opening times, time between receiving past notifications relating to calendar openings and past user acceptance of calendar openings, and methods of booking past calendar openings; and
    wherein matching the at least one customer user to the calendar opening based on the social network profile of the at least one customer user includes determining a priority of the at least one customer user, wherein the priority of the at least one customer user is selected from a tier of priorities.

2. The method of claim 1, wherein the step of automatically sending the notification of the calendar opening to the at least one device of the at least one customer user is performed based on a proximity of the at least one device of the at least one customer user to the service provider device, wherein the notification of the calendar opening includes at least one advertisement for another calendar opening at a second service provider, and wherein the second service provider serves a different market than the service provider.

3. The method of claim 1, further comprising the at least one server sending the at least one customer user a notification about another calendar opening at a second service provider, wherein the second service provider serves a different market than the service provider.

4. The method of claim 1, further comprising the at least one customer user offering the calendar opening for sale to the other users through the social network, wherein the at least one device of the at least one customer user is connected to the at least one server through the social network, further comprising the other users inviting social connections to interact with the calendar opening for sale, wherein the at least one customer user is compensated via cryptocurrency from an accepting customer user upon acceptance of the calendar opening by the accepting customer user.

5. The method of claim 1, wherein creating the social network profile in the database for the at least one customer user by querying outside databases or memory systems for information relating to the at least one customer user includes retrieving data from user visited websites and/or social media profiles.

6. The method of claim 1, wherein the compensation includes a higher priority to receive future calendar opening notifications.

7. The method of claim 1, wherein the information relating to the at least one customer user includes social network activity, wherein the social network activity includes posting activity relating to appointment creators, sharing photos relating to the appointment creators, and/or sharing photos of goods and/or services provided by the appointment creators.

8. The method of claim 1, further comprising posting the notification of the calendar opening to a social media platform, wherein the posting of the notification of the calendar opening includes an interactive element which provides acceptance of the calendar opening upon activation of the interactive element.

9. The method of claim 1, further comprising scheduling a second appointment based upon attendance of the appointment associated with the calendar opening.

10. The method of claim 1, further comprising filtering calendar openings based on insurance information associated with the at least one customer user.

11. The method of claim 1, further comprising filtering calendar openings based on a personal calendar or a professional calendar of the at least one customer user, wherein access for the at least one server to the personal calendar or the professional calendar of the at least one customer user is granted through a social login.

12. The method of claim 1, further comprising offering a discount for the calendar opening, wherein the discount is based on a lead time of the notification of the calendar opening.

13. A system for automated filling of calendar appointments on the Internet comprising:
    at least one server having a memory, a processor, a database, and a matching engine connected over the Internet to at least one device of at least one customer user and a service provider device;
    the at least one server operable to create a social network profile in the database for at least one customer user by querying outside databases or memory systems for information relating to the at least one customer user, wherein the information relating to the at least one customer user includes social network activity;

the at least one server operable to receive a notification of a calendar opening from the service provider device;

the at least one server operable to match the at least one customer user to the calendar opening based on the social network profile of the at least one customer user and service provider preferences; and the at least one server operable to automatically send a notification of the calendar opening to the at least one device of the at least one customer user;

wherein the at least one server is operable to receive an acceptance of the calendar opening from the at least one device;

wherein information about an appointment associated with the calendar opening is operable to be posted on a social network;

wherein the posting on the social network provides interactivity relating to the appointment including receiving offers from other users for the appointment including a trade of another appointment for the appointment or compensation for the appointment and interactivity to create a second appointment based on the appointment;

wherein the compensation for the appointment includes a cryptocurrency compensation;

wherein matching the at least one customer user to the calendar opening based on the social network profile of the at least one customer user and the service provider preferences is performed based on a Preference Correlation Coefficient (PCC), wherein the PCC includes a match value between the service provider preferences and preferences of the at least one customer user, wherein factors on which the PCC is based are weighted, and wherein the PCC is based on user preference for the service provider, user preference for calendar opening times, time between receiving past notifications relating to calendar openings and past user acceptance of calendar openings, and methods of booking past calendar openings; and wherein matching the at least one customer user to the calendar opening based on the social network profile of the at least one customer user includes determining a priority of the at least one customer user, wherein the priority of the at least one customer user is selected from a tier of priorities.

14. The system of claim 13, wherein upon the at least one customer user accepting the calendar opening, the at least one server is further operable to send the user a notification about another calendar opening at a second service provider, wherein the second service provider serves a different market than the service provider.

15. The system of claim 13, further comprising a second customer user device, wherein the second customer user device is in communication over the Internet with the at least one server, wherein the at least one device of the at least one customer user is operable to offer the calendar opening for sale to the second customer user device through the at least one server, wherein the at least one customer user is compensated via cryptocurrency from an accepting customer user associated with the second customer user device upon acceptance of the calendar opening by the accepting customer user.

16. The system of claim 13, wherein the at least one server is operable to create the social network profile in the database for the at least one customer user by querying data from social media profiles.

17. A system for automated filling of calendar appointments on the Internet comprising:

at least one server having a memory, a processor, a database, and a matching engine connected over the Internet to at least one device of at least one customer user and a service provider device;

wherein the at least one server is operable to create a social network profile in the database for the at least one customer user by querying outside databases or memory systems for information relating to the at least one customer user;

wherein the at least one server is operable to match the at least one customer user to the calendar opening based on the social network profile of the at least one customer user and service provider preferences;

wherein the at least one server is operable to send a notification of a calendar opening to the at least one device of the at least one customer user;

wherein the at least one server is operable to receive an acceptance of the calendar opening from the at least one device;

wherein information about an appointment associated with the calendar opening is operable to be posted on a social network;

wherein the posting on the social network provides interactivity relating to the appointment including receiving offers from other users for the appointment including a trade of another appointment for the appointment or compensation for the appointment and interactivity to create a second appointment based on the appointment;

wherein the compensation for the appointment includes a cryptocurrency compensation;

wherein matching the at least one customer user to the calendar opening based on the social network profile of the at least one customer user and the service provider preferences is performed based on a Preference Correlation Coefficient (PCC), wherein the PCC includes a match value between the service provider preferences and preferences of the at least one customer user, wherein factors on which the PCC is based are weighted, and wherein the PCC is based on user preference for the service provider, user preference for calendar opening times, time between receiving past notifications relating to calendar openings and past user acceptance of calendar openings, and methods of booking past calendar openings; and wherein matching the at least one customer user to the calendar opening based on the social network profile of the at least one customer user includes determining a priority of the at least one customer user, wherein the priority of the at least one customer user is selected from a tier of priorities.

* * * * *